United States Patent
Futakuchi et al.

(10) Patent No.: US 6,735,158 B1
(45) Date of Patent: May 11, 2004

(54) MULTILAYER OPTICAL DISK, AND METHOD AND DEVICE FOR RECORDING OPTICAL INFORMATION THEREON

(75) Inventors: Ryutaro Futakuchi, Osaka (JP); Shunji Ohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/913,358

(22) PCT Filed: Apr. 3, 2000

(86) PCT No.: PCT/JP00/02159

§ 371 (c)(1),
(2), (4) Date: Aug. 13, 2001

(87) PCT Pub. No.: WO00/62286

PCT Pub. Date: Oct. 19, 2000

(30) Foreign Application Priority Data

Apr. 7, 1999 (JP) .......................... 11-099664
May 31, 1999 (JP) .......................... 11-151078

(51) Int. Cl.$^7$ .................................. G11B 3/90
(52) U.S. Cl. ....................... 369/53.31; 369/47.28; 369/275.3
(58) Field of Search .................. 369/47.28, 47.31, 369/47.55, 53.31, 53.34, 53.44, 94, 124.07, 124.08, 275.3

(56) References Cited

U.S. PATENT DOCUMENTS 6,421,315 B1 * 7/2002 Satoh et al. ............. 369/275.3
6,656,560 B2 * 12/2003 Yamamoto et al. ........ 428/64.4

FOREIGN PATENT DOCUMENTS

| JP | 61-265748 | 11/1986 |
|----|-----------|---------|
| JP | 1-286129  | 11/1989 |
| JP | 5-54393   | 3/1993  |
| JP | 7-211048  | 8/1995  |
| JP | 10-505188 | 5/1998  |
| JP | 11-39657  | 2/1999  |
| WO | WO 96/31875 | 10/1996 |

* cited by examiner

Primary Examiner—Paul W. Huber
(74) Attorney, Agent, or Firm—Merchant & Gould P.C.

(57) ABSTRACT

A disc capable of reproducing an address signal and a data signal correctly even by using a multilayer optical disc that includes a plurality of recording reproduction surfaces bonded together in a state in which front positions in sectors of the respective recording reproduction surfaces do not match completely, a method and a device are provided. In one embodiment, a relationship between a bonding precision L and a length G of a gap area is determined to be $L \leq G$. In another embodiment, by recording information in a range of a length corresponding to the bonding precision L not only in the data area but also in the gap area, a data recording starting position and a data recording ending position for each sector of the respective recording reproduction surfaces are matched. In yet another embodiment, guard areas are provided in a tip portion and a back end portion of the data area.

9 Claims, 10 Drawing Sheets

US 6,735,158 B1

MULTILAYER OPTICAL DISK, AND METHOD AND DEVICE FOR RECORDING OPTICAL INFORMATION THEREON

This application is a 371 of PCT/JP00/02159, filed Apr. 3, 2000.

TECHNICAL FIELD

The present invention relates to a multilayer optical disc having a plurality of recording reproduction surfaces, a method and a device for recording optical information in this multilayer optical disc.

BACKGROUND ART

A conventionally known multilayer optical disc capable of recording on and reproducing from a plurality of recording reproduction surfaces is described, for example, in JP 10(1998)-505188A.

In the following, the structure of a conventional multilayer optical disc will be explained by referring to the drawings. FIG. 7 is a cross-sectional view showing a conventional optical disc 10 taken in the direction perpendicular to the track direction. In addition, for simplifying the explanation, an optical disc of a double layer structure will be used.

As shown in FIG. 7, a guiding groove 7 for tracking (alternatively, an address signal recorded in advance and formed as a pit) is formed on one surface side of a first substrate 1, and further on this surface, a recording reproduction film for partially reflecting and partially transmitting an optical beam 8 entering the first substrate 1, focused by an objective lens 9, is formed to create a first recording reproduction surface 3. Furthermore, a guiding groove 6 for tracking (alternatively, an address signal recorded in advance and formed as a pit) also is formed on the surface of a second substrate 2, and a recording reproduction film for reflecting the optical beam 8 passing through the first recording reproduction surface 3 is formed to create a second recording reproduction surface 4. Furthermore, a separating layer 5 is interposed to separate the first recording reproduction surface 3 and the second recording reproduction surface 4 and to bond them together.

However, the multilayer structure as mentioned above (double layer structure in the conventional example) suffers from the following problem when the bonded state in the cross-sectional view taken perpendicular to the aforementioned cross-sectional view, that is in the track direction, is as that shown in FIG. 8.

In addition, for explanatory purposes, FIG. 8 expresses the actual sector structure (shown in FIG. 9(b)) of a multilayer optical disc, which is shown as a plan view in FIG. 9(a), in the form of a schematic sector structure for each recording reproduction surface.

FIG. 9(b) is, as shown in FIG. 9(a), an enlarged view of the vicinity of an address area 92 in a certain track among a group of tracks 91 formed as concentric circles or spirally in the multilayer optical disc, and shows a part of a groove portion 93 in the (n−1)th sector, an address pit portion 941 corresponding to an address area of the nth sector to be described later, and a part of a groove portion 942 in the following nth sector 94. This groove portion, expressed in the form of a schematic sector structure, is divided into a gap area and a data area to be described later.

Moreover, the constituent elements shown in FIG. 7, i.e. the first substrate 1, the second substrate 2 and the separating layer 5 are omitted in FIG. 8 for explanatory purposes.

In FIG. 8, 31 is a first recording reproduction surface, and 41 is a second recording reproduction surface. 311, 312 and 313 respectively are an address area, a data area and a gap area for dividing the address area 311 and the data area 312 in the first recording reproduction surface 31. Moreover, 411, 412 and 413 respectively are an address area, a data area and a gap area for dividing the address area 411 and the data area 412 in the second recording reproduction surface 32.

The gap areas 313, 413 are provided to perform a signal processing, when a recording and a reproduction for a multilayer optical disc are performed by a drive, by clearly separating a reproduced address signal and a reproduced data signal of a data area, and by avoiding the gap areas 313, 413, the recording operation is performed respectively for the first recording reproduction surface 31 and the second recording reproduction surface 41.

However, as shown in FIG. 8, when the heads of the address areas 311 and 411, that is, the front positions of sectors are bonded together by a shift L1, and when this amount of shift L1 is larger than a length G1 of the gap areas 313 and 413, an area Δ1, which is an area at the rear end portion in the address area 311 of the first recording reproduction surface 31, overlaps with an area Δ2, which is an area at the front end portion in the data area 412 of the second recording reproduction surface 41, in the irradiation direction of an optical beam 81, that is, seen from above the surface. In addition, a length of the area Δ1 and that of the area Δ2 are equal to L1−G1.

Furthermore, the optical beam 81 passes through the area Δ1 of the first recording reproduction surface 31 and is emitted onto the area Δ2 of the second recording reproduction surface 41 to record information.

Here, when the two recording reproduction surfaces of this multilayer optical disc are made of phase change type recording reproduction films, a recording in a phase change type recording reproduction film is performed based on the principle of changing its crystal structure by irradiation of a high-power optical beam. Therefore, when the recording is preformed for the area Δ2 in the second recording reproduction surface 41, that is, for the area at the front end portion in the data area 412 of the second recording reproduction surface 41, the high-power optical beam 81 is emitted also onto the area Δ1 at the rear end portion in the address area 311 of the first recording reproduction surface 31.

Therefore, the crystal structure of the recording reproduction film formed on one part in the address area 311 of the first recording reproduction surface 31 also is affected. As a result, when the address area 311 of the first recording reproduction surface 31 is to be reproduced after completing the recording operation for the second recording reproduction surface 41, the S/N ratio of the reproduced signal is deteriorated, and the problem that the address information cannot be recognized correctly arises.

Furthermore, the example shown in FIG. 8 was explained by referring to the case where the first recording reproduction surface 31 and the second recording reproduction surface 41 were bonded together in a state in which the front position in the sector of the first recording reproduction surface 31 is shifted to the right side of the surface relative to the second recording reproduction surface 41. Similarly, also in the case where the front position in the sector of the first recording reproduction surface 31 is shifted to the left side of the surface relative to the second recording reproduction surface 41 and bonded together, the address area 411 of the second recording reproduction surface 41 is affected when a recording operation for the first recording reproduction surface 31 is performed. As a result, the S/N ratio of the reproduced signal from the address area 411 is deteriorated, and the problem that the address information cannot be recognized correctly arises.

Moreover, the conventional example was explained by referring to the case of having two recording reproduction surfaces, but also in the case of having three and more recording reproduction surfaces, a recording operation for an arbitrary recording reproduction surface affects address areas in other recording reproduction surfaces, so that the problem that this address information cannot be recognized correctly arises.

Furthermore, in the case where data are already recorded in the data areas of both recording reproduction surfaces, at the time when a recording operation is performed for one of the recording reproduction surfaces, also for the data area in the other recording reproduction surface, a high-power optical beam is emitted onto an area where the respective data areas overlap with each other (Δ3 shown in FIG. 8), so that errors arise due to the deteriorated S/N ratio of the reproduced signal. Generally, an error correction code is appended to data, so that the content of the reproduced data is restored by this function to some degree but not completely. The deterioration in the S/N ratio of the reproduced signal in this data area will be explained below more in detail.

Like FIG. 8, FIG. 10 is a diagram expressing the actual sector structure of a conventional multilayer optical disc in the form of a schematic sector structure for each recording reproduction surface. In addition, in FIG. 10, the same reference numerals are given to the same constituents as those in FIG. 8, and the explanations thereof are omitted.

First, FIG. 10(*a*) will be explained. FIG. 10(*a*) shows a state in which the first recording reproduction surface 31 is shifted in the scanning direction (to the right side of the surface) of the optical beam 81 relative to the second recording reproduction surface 41 and bonded together. In FIG. 10, a section Z1 or a section Z3 is an area where the data area 312 of the first recording reproduction surface 31 does not overlap with the data area 412 of the second recording reproduction surface 41 and corresponds to a predetermined precision at the time when the two recording reproduction surfaces are bonded together. Moreover, a section Z2 shows an area where the data area 312 of the first recording reproduction surface 31 overlaps with the data area 412 of the second recording reproduction surface 41.

When optical information (data) is already recorded in the data area 312 of the first recording reproduction surface 31, due to the fact that the optical conditions of the recording reproduction surfaces differ and that the transmittances of the optical beam 81 are different, the recording power of the emitted optical beam 81 differs in the section Z1 and in the section Z2 of the data area 412 on the second recording reproduction surface 41.

Next, FIG. 10(*b*) will be explained. FIG. 10(*b*) shows a state in which the first recording reproduction surface 31 is shifted in the direction opposite to the scanning direction (to the left side of the surface) of the optical beam 81 relative to the second recording reproduction surface 41 and bonded together. As in FIG. 10(*a*), the section Z1 or the section Z3 shown in FIG. 10(*b*) is an area where the data area 312 of the first recording reproduction surface 31 does not overlap with the data area 412 of the second recording reproduction surface 41 and corresponds to a predetermined precision at the time when the two recording reproduction surfaces are bonded together. Moreover, as in FIG. 10(*a*), also the section Z2 shows an area where the data area 312 of the first recording reproduction surface 31 overlaps with the data area 412 of the second recording reproduction surface 41.

Here, when data are already recorded in the data area 312 of the first recording reproduction surface 31, due to the fact that the optical conditions of the recording reproduction surfaces differ and that the transmittances of the optical beam 81 are different, the recording power of the emitted optical beam 81 differs in the section Z1 and in the section Z2 of the data area 412 on the second recording reproduction surface 41.

When the transmittance before recording is smaller than the transmittance after recording, a recording for the second recording reproduction surface 41 is performed by taking this transmittance into account. But even when the data could be recorded with an optimal recording power in the section Z2, a recording beam with an excessive power is emitted onto the portion corresponding to the section Z1 (in the case of FIG. 10(*a*)) or the section Z3 (in the case of FIG. 10(*b*)). On the other hand, when the transmittance before recording is larger than the transmittance after recording, a recording for the second recording reproduction surface 41 is performed by taking this transmittance into account. But even when the data could be recorded with an optimal recording power in the section Z2, a recording beam with a much smaller power will be emitted onto the portion corresponding to the section Z1 (in the case of FIG. 10(*a*)) or the section Z3 (in the case of FIG. 10(*b*)).

As a result, when a reproduction signal is to be obtained from the second recording reproduction surface 41, a difference in the signal amplitude of the reproduction signal may arise between the portions corresponding to the sections Z1 and Z2 (in the case of FIG. 10(*a*)) or the sections Z2 and Z3 (in the case of FIG. 10(*b*)). Thus, a difference in the S/N ratio may arise within the data area, so that a part of the data recorded in the second recording reproduction surface 41 may not be read out correctly even by using an error correction code appended to the data.

In particular, when a phase change type material is used for the recording films constructing the recording reproduction surfaces, due to the fact that its phase state changes (crystal state and amorphous state) by recording data, the difference in the transmittance before and after the recording is large, so that the problem mentioned above becomes more notable.

DISCLOSURE OF THE INVENTION

Therefore, it is an object of the present invention to provide a multilayer optical disc capable of reproducing an address signal and a data signal correctly even when using a multilayer optical disc that is made up of a plurality of recording reproduction surfaces bonded together in a state in which front positions in sectors of the respective recording reproduction surfaces do not match completely. Another object is to provide a method and a device for recording optical information in this multilayer optical disc.

To achieve the above object, a first multilayer optical disc of the present invention is characterized in that the multilayer optical disc has a plurality of recording reproduction surfaces having a sector structure, in which an address area and a data area recorded in advance are divided by a gap area of a predetermined length, and that the plurality of recording reproduction surfaces are bonded together such that front positions of sectors in the plurality of recording reproduction surfaces are aligned with a precision of not more than the length of the gap area.

Furthermore, to achieve the above object, a second multilayer optical disc of the present invention is characterized in that a plurality of recording reproduction surfaces having a sector structure, in which an address area and a data area recorded in advance are divided by a gap area, are bonded together with a predetermined precision with reference to front positions of the sectors, and that the length of the gap area is not less than the predetermined precision with reference to the front positions of the sectors.

Furthermore, to achieve the above object, a third multilayer optical disc of the present invention is characterized in that the multilayer optical disc includes a first recording surface and a second recording surface, each having an address area, a data area for recording information and a gap area with a predetermined length arranged between the address area and the data area, wherein an amount of displacement between a front position in the address area of the first recording surface and a front position in the address area of the second recording surface, seen from a direction of a beam emitted onto the recording surfaces for recording and reproduction of information, is smaller than the length of the gap area.

Furthermore, to achieve the above object, a fourth multilayer optical disc of the present invention is characterized in that the multilayer optical disc includes a first recording surface and a second recording surface, each having an address area, a data area for recording information and a gap area with a predetermined length arranged between the address area and the data area, wherein an amount of displacement between a back end position in the address area of the first recording surface and a back end position in the address area of the second recording surface, seen from a direction of a beam emitted onto the recording surfaces for recording and reproduction of information, is smaller than the length of the gap area.

Furthermore, to achieve the above object, an optical information recording method according to the present invention is a method for recording optical information in a multilayer optical disc including a plurality of recording reproduction surfaces formed on every layer, with a sector structure having a gap area arranged between an address area and a data area in a scanning direction of an optical beam, wherein a bonding precision L with reference to a front position in the sector of a certain recording reproduction surface and a length G of the gap area in the scanning direction satisfies a relationship of $L \leq G$ for all recording reproduction surfaces. The method is characterized by the steps of detecting an amount of displacement between front positions in the sectors of other recording reproduction surfaces relative to the front position in the sector of the certain recording reproduction surface, and, based on the detected amount of displacement, determining a data recording starting position and a data recording ending position for each recording reproduction surface such that the data recording starting position and the data recording ending position of the respective sectors are matched in the plurality of recording reproduction surfaces.

In addition, in the optical information recording method of the present invention, it is preferable that the data recording starting position and the data recording ending position respectively are determined to be the starting position and the ending position in the data area of the recording reproduction surface where the front position of the sector is displaced most in a direction opposite to the scanning direction among the plurality of recording reproduction surfaces.

Furthermore, to achieve the above object, an optical information recording device according to the present invention is a method for recording optical information in a multilayer optical disc including a plurality of recording reproduction surfaces formed on every layer, with a sector structure having a gap area arranged between an address area and a data area in a scanning direction of an optical beam, wherein a bonding precision L with reference to a front position in the sector of a certain recording reproduction surface and a length G of the gap area in the scanning direction satisfies a relationship of $L \leq G$ for all recording reproduction surfaces. The device is characterized in that the device includes a detection part for detecting an amount of displacement between front positions in the sectors of other recording reproduction surfaces relative to the front position in the sector of the certain recording reproduction surface, and a gate signal generation part for generating a gate signal designating a data recording ending position from a data recording starting position for each recording reproduction surface to match the data recording starting positions and the data recording ending positions of the respective sectors in the plurality of recording reproduction surfaces, based on the amount of displacement detected by the detection part.

In addition, in the optical information recording device of the present invention, it is preferable that the gate signal designates the data recording starting position and the data recording ending position to be the starting position and the ending position in the data area of the recording reproduction surface where the front position of the sector is displaced most in a direction opposite to the scanning direction among the plurality of recording reproduction surfaces.

Furthermore, to achieve the above object, a fifth multilayer optical disc of the present invention is characterized in that the multilayer optical disc includes layers on which a plurality of recording reproduction surfaces are formed, with a sector structure having a gap area arranged between an address area and a data area in a scanning direction of an optical beam, bonded together such that front positions in the sectors of the respective recording reproduction surfaces are contacted closely to each other in the scanning direction by a predetermined precision, wherein guard data recording areas having a length of not less than the predetermined precision are allocated to a tip portion and to a back end portion of the data area in the scanning direction.

According to the configuration mentioned above, by determining the bonding precision between the plurality of recording reproduction surfaces to be not more than the predetermined length of the gap area or by determining the length of the gap area to be not less than the bonding precision between the plurality of recording reproduction surfaces of the multilayer optical disc, a recording operation for an arbitrary recording reproduction surface does not affect address areas in other recording reproduction surfaces, so that the address information can be recognized correctly after completing the recording at the time of reproduction.

Moreover, even when the plurality of recording reproduction surfaces are bonded together in a state in which they are not matched but shifted, by satisfying the relationship of $L \leq G$ between the predetermined precision L corresponding to this amount of displacement and the length G of the gap area, matching the recording range for a certain recording reproduction surface with the data area, determining the recording range for other recording reproduction surfaces to be an area including a part of the gap area in addition to the most part of the data area, and recording while matching the data recording starting positions and the data recording ending positions in the plurality of recording reproduction surfaces, even in the case where the certain recording reproduction surface is already recorded, the recording for the other recording reproduction surfaces can be performed with a uniform recording power. Therefore, a non-uniform recording power can be prevented, and an amplitude difference in the reproduction signal of the data, that is, a S/N difference is suppressed, so that the recorded data information can be reproduced correctly.

Furthermore, even when the respective data areas in the plurality of recording reproduction surfaces have portions overlapping in the scanning direction, by providing guard data recording areas for data protection in the tip portion and the back end portion of the data areas, the reproduced data information is not affected even when there is an amplitude difference in the reproduction signal in these guard data recording areas resulting from the effective power difference in the recording beam, and therefore, correct reproduced data information can be obtained.

BEST MODE FOR CARRYING OUT THE INVENTION

Figure 1:
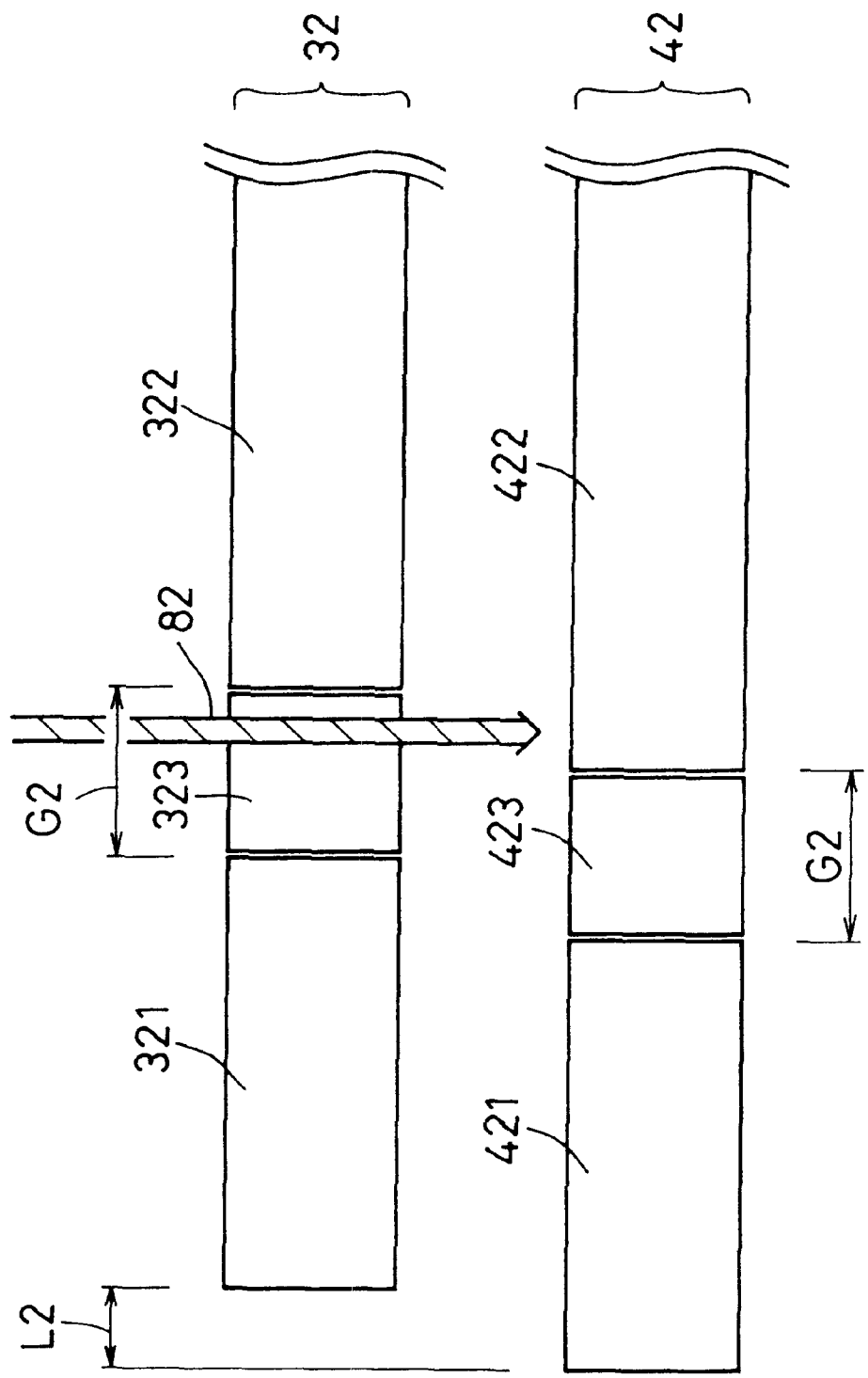
FIG. 1 is a diagram showing a schematic sector structure of each recording reproduction surface in a multilayer optical disc according to a first embodiment of the present invention.

In the following, preferable embodiments of the present invention will be explained by referring to the drawings. Here, for the purposes of simplicity, a multilayer optical disc having a double layer structure will be used for explanation.

First Embodiment

Figure 8:
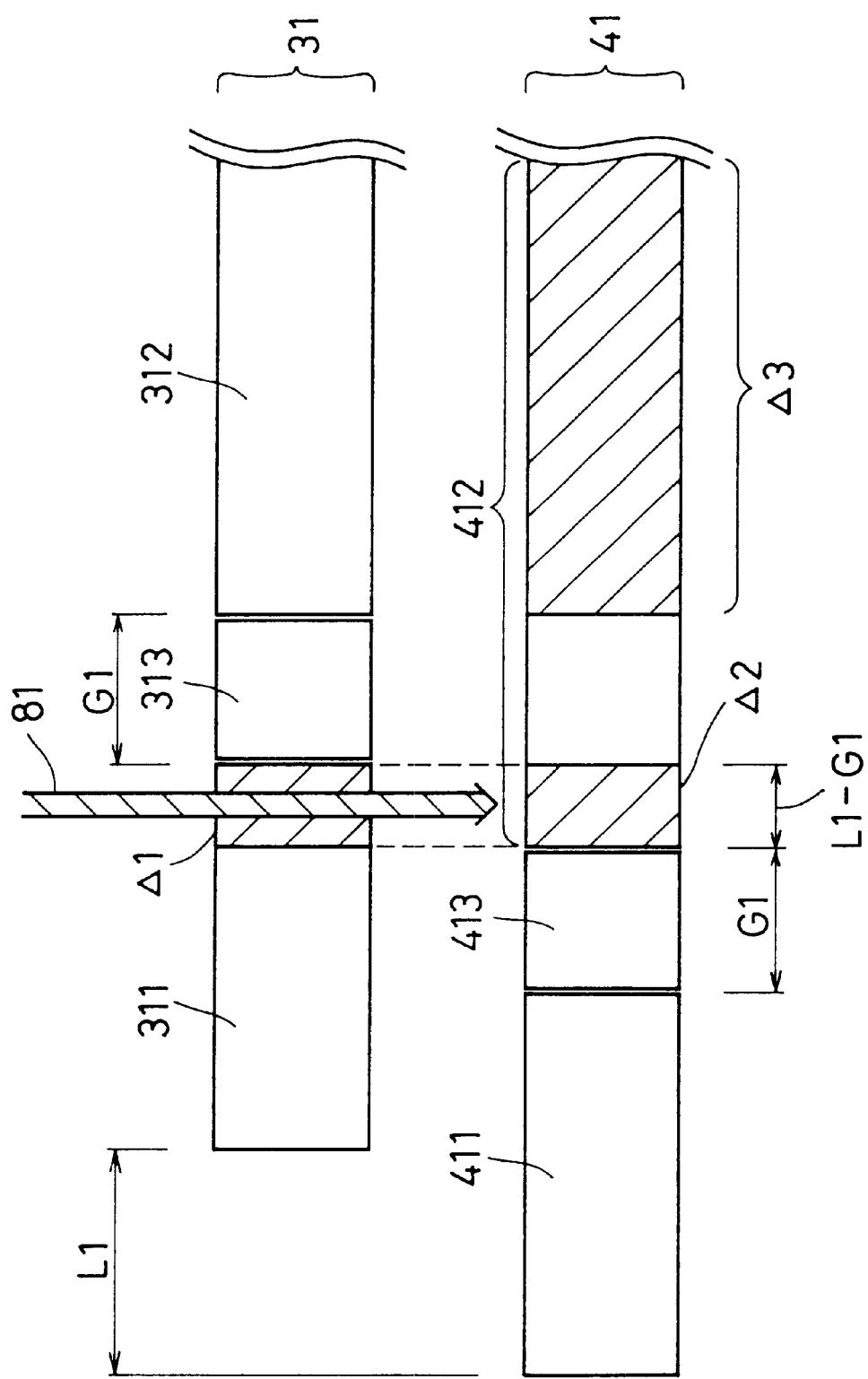
FIG. 8 is a diagram showing a schematic sector structure of each recording reproduction surface in a conventional multilayer optical disc.
Figure 9:
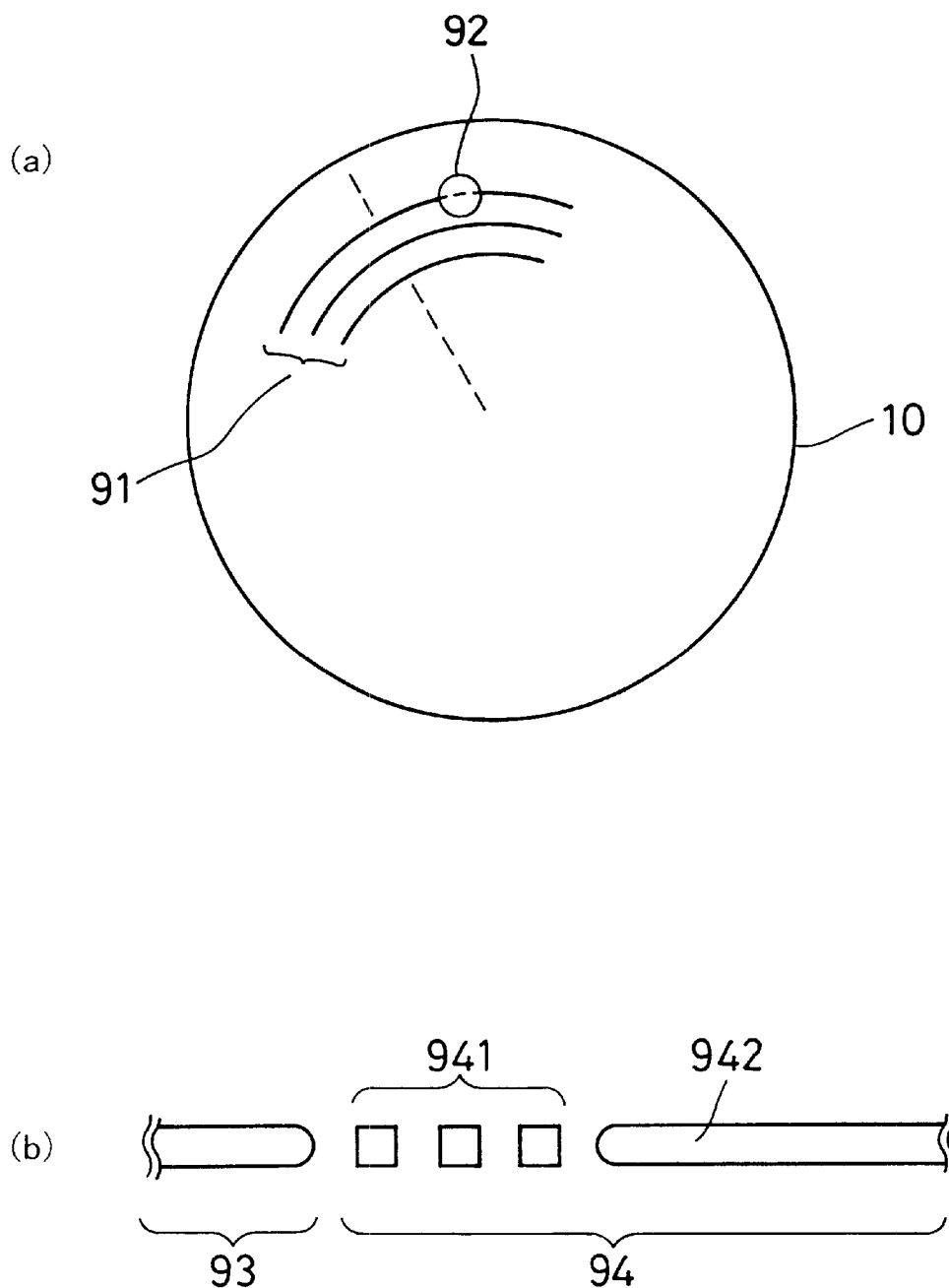
FIG. 9(a) and FIG. 9(b) respectively are a plan view of a multilayer optical disc and an enlarged view of a vicinity of an address area in a track.
Figure 10:
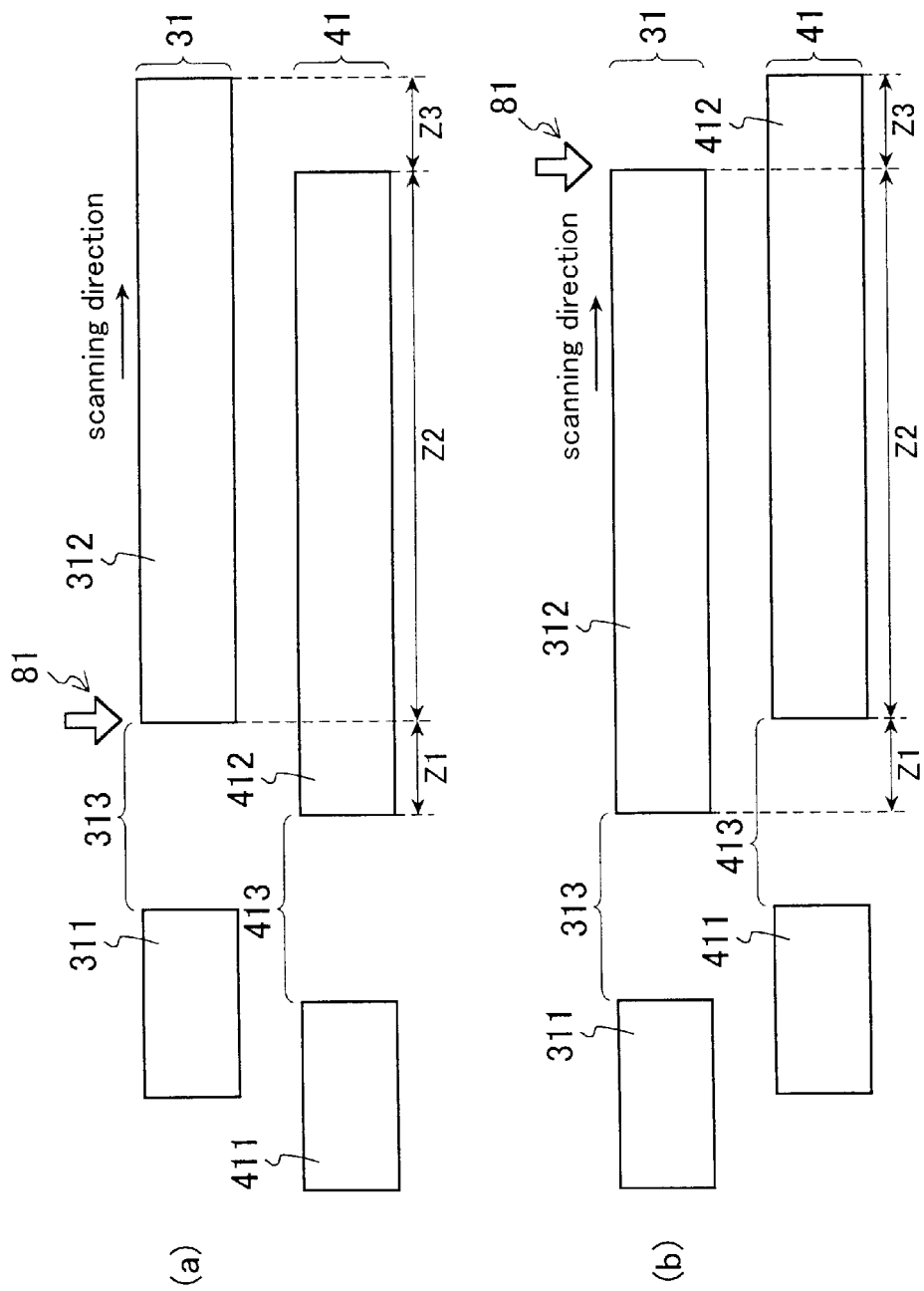
FIG. 10(a) and FIG. 10(b) are diagrams respectively showing a schematic sector structure of each recording reproduction surface in a conventional multilayer optical disc, in cases where a first recording reproduction surface is shifted in the scanning direction relative to a second recording reproduction surface and in the direction opposite to the scanning direction.

FIG. 1 shows the sector structure of each recording reproduction surface in a multilayer optical disc according to a first Embodiment of the present invention, which is expressed in the form of a schematic sector structure for clarifying the characteristics of the present invention, as with FIG. 8 showing a conventional example.

In FIG. 1, 32 and 42 respectively are a first recording reproduction surface and a second recording reproduction surface in the present embodiment shown in the form of sector formats. Furthermore, 321 and 421 respectively are address areas of the first recording reproduction surface 32 and the second recording reproduction surface 42, and 322 and 422 respectively are data areas of the first recording reproduction surface 32 and the second recording reproduction surface 42. 323 and 423 respectively are gap areas with a predetermined length in the first recording reproduction surface 32 and the second recording reproduction surface 42, both of which are G2 in length.

Furthermore, L2 shows an amount of displacement between front positions in sectors of the respective recording reproduction surfaces at the time when the first recording reproduction surface 32 and the second recording reproduction surface 42 are bonded together. This amount of displacement L2 satisfies the relationship $L2 \leq G2$, where G2 is the length of the gap areas 323 and 324. Thus no overlapping area exists when viewed from above the surface in the irradiation direction of an optical beam 81, such as can be seen in FIG. 8 at the back end of the address area 321 of the first recording reproduction surface 32 and at the front end of the data area 422 of the second recording reproduction surface 42. The tolerance in the amount of displacement L2 where no overlapping area exists corresponds to the length G2 of the gap area 323 and 423. In other words, when the bonding precision L2 between the front positions of the sectors is determined to be not more than the length G2 of the gap area, an overlapping area does not exist any more.

Therefore, according to FIG. 1, when a recording for the second recording reproduction surface 42 is performed, a high-power optical beam 82 is emitted from the front in the data area 422 of the second recording reproduction surface 42, and at this time, an area of the first recording reproduction surface 32 on which the high-power optical beam 82 is emitted is its gap area 323. Thus, a high-power irradiation to the address area 321 of the first recording reproduction surface 32 can be avoided, and the crystal structure of a recording reproduction film formed in the address area 321 is not affected. As a result, even when the address area 321 of the first recording reproduction surface 32 is reproduced after the recording operation for the second recording reproduction surface 42 is completed, the S/N ratio of the reproduced signal is not deteriorated, and the address information can be recognized correctly.

Furthermore, as shown in FIG. 1, the present embodiment was explained by referring to the case in which the first recording reproduction surface 32 and the second recording reproduction surface 42 are bonded together in a state in which the front position in the sector of the first recording reproduction surface 32 is shifted to the right side of the surface relative to the second recording reproduction surface 42. However, also in the case in which the front position in the sector of the first recording reproduction surface 32 is shifted to the left side of the surface relative to the second recording reproduction surface 42 and bonded together, when a recording operation for the first recording reproduction surface 32 is performed, the high-power optical beam 82 is emitted from the front in the data area 322 of the first recording reproduction surface 32, and at this time, an area of the second recording reproduction surface 42 on which the high-power optical beam 82 is emitted is its gap area 423.

Therefore, a high-power irradiation to the address area 421 of the second recording reproduction surface 42 can be avoided, and the crystal structure of a recording reproduction film formed in the address area 421 is not affected. As a result, even when the address area 421 of the second recording reproduction surface 42 is reproduced after the recording operation for the first recording reproduction surface 32 is completed, the S/N ratio of the reproduced signal is not deteriorated, and the address information can be recognized correctly.

Furthermore, the present embodiment was explained by referring to the case of having two recording reproduction surfaces. However, it is needless to say that even when there are three or more recording reproduction surfaces, a recording operation for an arbitrary recording reproduction surface does not affect address areas in other recording reproduction surfaces, and that the address information can be recognized correctly.

In this way, by bonding together the plurality of recording reproduction surfaces such that the amount of displacement between the front positions of the sectors in the plurality of recording reproduction surfaces, that is, the bonding precision for the plurality of recording reproduction surfaces, is not more than the predetermined length of the gap area, the address information can be recognized correctly when it is reproduced after recording.

Second Embodiment

Figure 2:
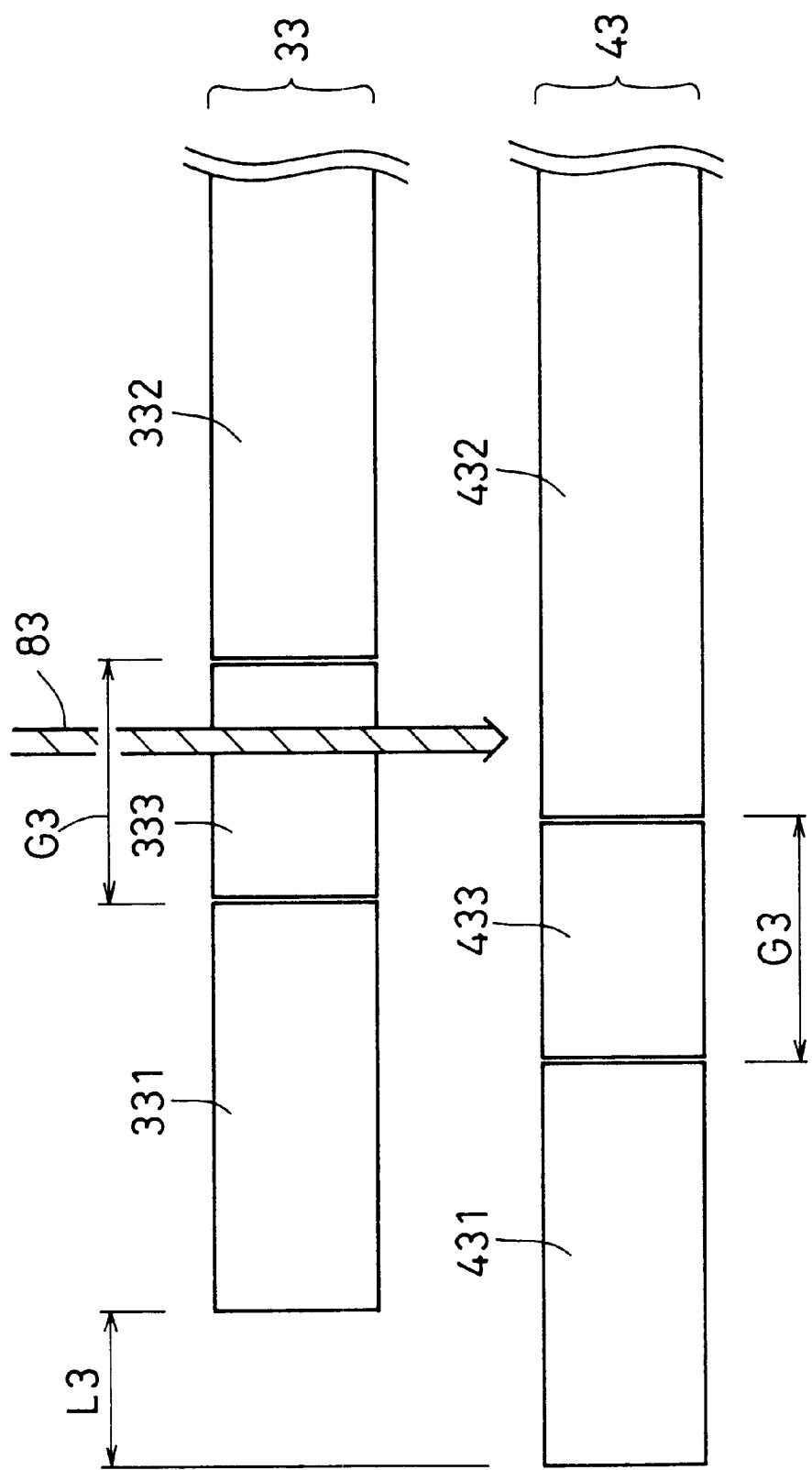
FIG. 2 is a diagram showing a schematic sector structure of each recording reproduction surface in a multilayer optical disc according to a second embodiment of the present invention.

FIG. 2 shows the sector structure of each recording reproduction surface in a multilayer optical disc according to a second Embodiment of the present invention, which is expressed in the form of a schematic sector structure for clarifying the characteristics of the present invention, as in the first Embodiment.

In FIG. 2, 33 and 43 are a first recording reproduction surface and a second recording reproduction surface in the present embodiment shown in the form of sector formats. Furthermore, 331 and 431 respectively are address areas of the first recording reproduction surface 33 and the second recording reproduction surface 43, and 332 and 432 respectively are data areas of the first recording reproduction surface 33 and the second recording reproduction surface 43. 333 and 433 respectively are gap areas of the first recording reproduction surface 33 and the second recording reproduction surface 43.

Furthermore, L3 shows an amount of displacement between front positions in sectors of the respective recording reproduction surfaces at the time when the first recording reproduction surface 33 and the second recording reproduction surface 43 are bonded together. This amount of displacement L3 shows a threshold value of this bonding precision, that is, a maximum amount of displacement with reference to the front positions of the sectors when the first recording reproduction surface 33 and the second recording reproduction surface 43 are bonded together.

Therefore, it satisfies $L3 \leq G3$, where G3 is the length of the gap areas 333 and 433. Thus no overlapping area exists when viewed from above the surface in the irradiation direction of an optical beam, such as can be seen in FIG. 8 at the back end of the address area 331 of the first recording reproduction surface 33 and at the front end of the data area 432 of the second recording reproduction surface 43. To eliminate this overlapping area, the length G3 of the gap area should be determined to be not less than the threshold value L3 of the bonding precision between the respective recording reproduction surfaces.

Therefore, according to FIG. 2, when a recording for the second recording reproduction surface 43 is performed, a high-power optical beam 83 is emitted from the front in the data area 432 of the second recording reproduction surface 43, and at this time, an area of the first recording reproduction surface 33 on which the high-power optical beam 83 is emitted is its gap area 333. Thus, a high-power irradiation to the address area 331 of the first recording reproduction surface 33 can be avoided, and the crystal structure of a recording reproduction film formed in the address area 331 is not affected. As a result, even when the address area 331 of the first recording reproduction surface 33 is reproduced after the recording operation for the second recording reproduction surface 43 is completed, the S/N ratio of the reproduced signal is not deteriorated, and the address information can be recognized correctly.

Furthermore, as shown in FIG. 2, the present embodiment was explained by referring to the case in which the first recording reproduction surface 33 and the second recording reproduction surface 43 are bonded together in a state in which the front position in the sector of the first recording reproduction surface 33 is shifted to the right side of the surface relative to the second recording reproduction surface 43. However, also in the case in which the front position in the sector of the first recording reproduction surface 33 is shifted to the left side of the surface relative to the second recording reproduction surface 43 and bonded together, when a recording operation for the first recording reproduction surface 33 is performed, the high-power optical beam 83 is emitted from the front in the data area 332 of the first recording reproduction surface 33, and at this time, an area of the second recording reproduction surface 43 on which the high-power optical beam 83 is emitted is its gap area 433.

Therefore, a high-power irradiation on the address area 431 of the second recording reproduction surface 43 can be avoided, and the crystal structure of a recording reproduction film formed in the address area 431 is not affected. As a result, even when the address area 431 of the second recording reproduction surface 43 is reproduced after the recording operation for the first recording reproduction surface 33 is completed, the S/N ratio of the reproduced signal is not deteriorated, and the address information can be recognized correctly.

Furthermore, the present embodiment was explained by referring to the case of having two recording reproduction surfaces. However, the feature of the present invention is applicable also to the case of having three or more recording reproduction surfaces. According to the present invention, a recording operation for an arbitrary recording reproduction surface does not affect address areas in other recording reproduction surfaces, and its address information can be recognized correctly.

In this way, by securing the length of the gap area to be not less than the threshold value of the bonding precision for the plurality of recording reproduction surfaces, the address information can be recognized correctly when it is reproduced after recording, and the same effect as that shown in the first Embodiment can be obtained.

Furthermore, the first Embodiment and the second Embodiment are characterized in that the amount of displacement between the front positions of the sectors is not more than the length of the gap area, and also in that the amount of displacement between the back ends of the address areas is not more than the length of the gap area.

Third Embodiment

Figure 3:
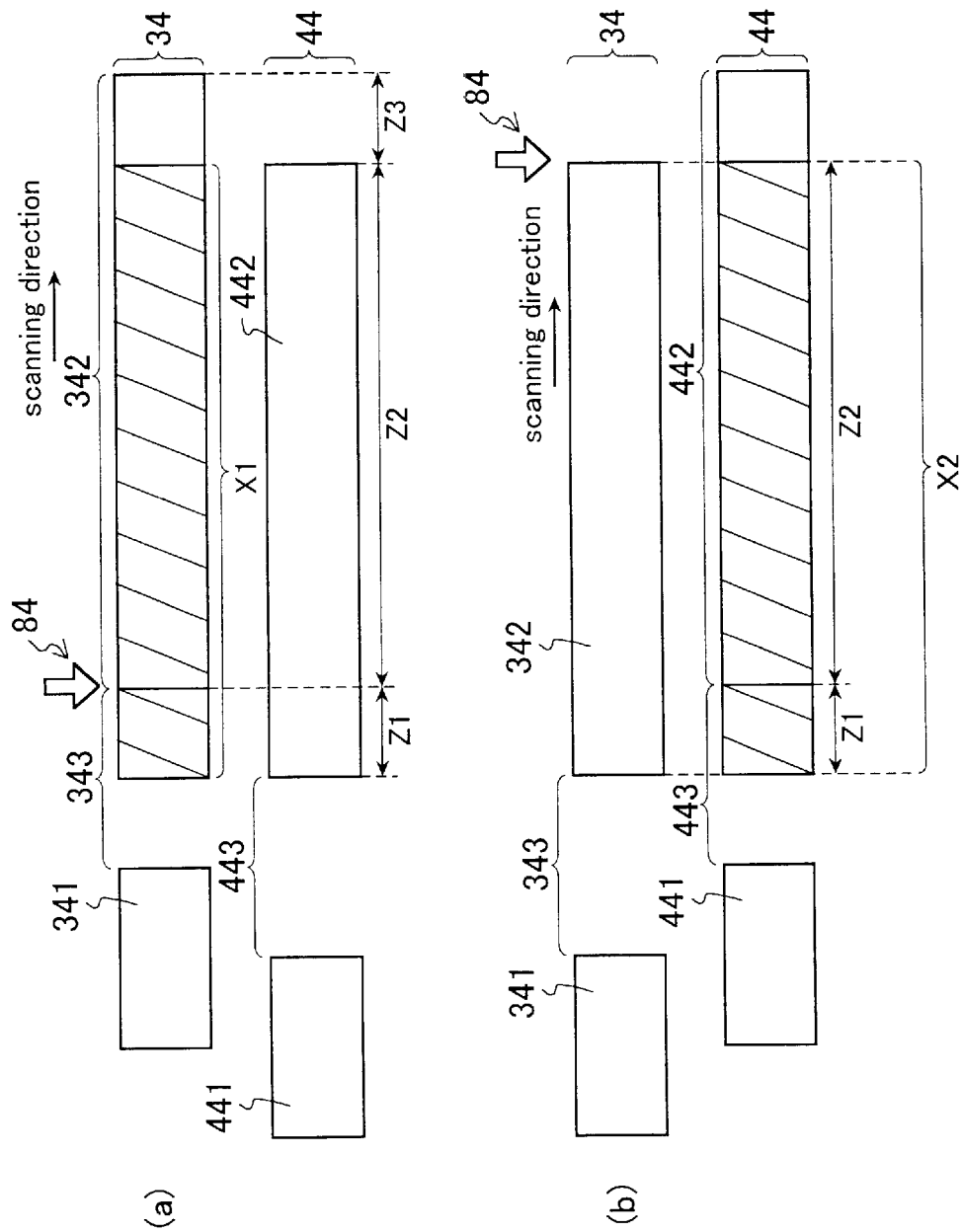
FIG. 3(a) and FIG. 3(b) are diagrams respectively showing a schematic sector structure of each recording reproduction surface in a multilayer optical disc for explaining one example of a recording method of a multilayer optical disc according to a third embodiment of the present invention, in cases where a first recording reproduction surface is shifted in the scanning direction relative to a second recording reproduction surface and in the direction opposite to the scanning direction.

FIG. 3(a) and FIG. 3(b) are diagrams showing the actual sector structure of each recording reproduction surface in a multilayer optical disc according to a third Embodiment of the present invention, which is expressed in the form of a schematic sector structure. FIG. 3(a) shows a state in which a first recording reproduction surface 34 is shifted in the scanning direction (to the right side of the drawing) of an optical beam 84 relative to a second recording reproduction surface 44 and bonded together. Furthermore, FIG. 3(b) shows a state in which the first recording reproduction surface 34 is shifted in the direction opposite to the scanning direction (to the left side of the drawing) of the optical beam 84 relative to the second recording reproduction surface 44 and bonded together.

In FIG. 3(a) and FIG. 3(b), 341, 343 and 342 respectively show an address area, a gap area and a data area of the first recording reproduction surface 34, and 441, 443 and 442 respectively show an address area, a gap area and a data area of the second recording reproduction surface 44. In addition, 341 and 441, 343 and 443, and 342 and 442 respectively have an equal length in the scanning direction of the optical beam 84. Furthermore, a section Z1 shows a section in FIG. 3(a) where a tip portion in the data area 442 of the second recording reproduction surface 44 overlaps with the gap area 343 of the first recording reproduction surface 34 and also a section in FIG. 3(b) where a tip portion in the data area 342 of the first recording reproduction surface 34 overlaps with the gap area 443 of the second recording reproduction surface 44. Therefore, a section Z2 shows a section where the data area 342 of the first recording reproduction surface 34 overlaps with the data area 442 of the second recording reproduction surface 44, and the section Z1 corresponds to a bonding precision between the first recording reproduction surface 34 and the second recording surface 44. Furthermore, the section Z1 is configured so as to be not more than the length of the gap area 343 of the first recording reproduction surface 34 and the gap area 443 of the second recording reproduction surface 44.

Furthermore, in FIG. 3(a), an area X1 shown by oblique lines on the first recording reproduction surface 34 shows a recording range for recording information in the first recording reproduction surface 34. That is, the recording range X1 for recording information in the first recording reproduction surface 34 corresponds to the total range obtained by adding the section Z1 at the back end portion in the gap area 343 of the first recording reproduction surface 34 and the section Z2.

In this way, by determining the recording range for recording information in the first recording reproduction surface 34 to be the same as the data area 442 of the recording range for recording information in the second recording reproduction surface 44, the recording ranges of the first recording reproduction surface 34 and the second recording reproduction surface 44 are matched. In other words, the data recording starting positions and the data recording ending positions are matched on the two recording reproduction surfaces.

The amount of information to be recorded is the same for the two recording reproduction surfaces. This amount of information becomes equal to the amount of information predetermined by the data areas 342 and 442.

On the other hand, in FIG. 3(b), an area X2 shown by oblique lines on the second recording reproduction surface 44 shows a recording range for recording information in the second recording reproduction surface 44. That is, the recording range X2 for recording information in the second recording reproduction surface 44 corresponds to the total range obtained by adding the section Z1 at the back end portion in the gap area 443 of the second recording reproduction surface 44 and the section Z2.

In this way, by determining the recording range for recording information in the second recording reproduction surface 44 to be the same as the data area 342 of the recording range for recording information in the first recording reproduction surface 34, the recording ranges of the first recording reproduction surface 34 and the second recording reproduction surface 44 are matched. In other words, the data recording starting positions and the data recording ending positions are matched on the two recording reproduction surfaces. Also in this case, the amount of information to be recorded is the same for the two recording reproduction surfaces, and this amount of information becomes equal to the amount of information predetermined by the data areas 342 and 442.

In this way, even when the two recording reproduction surfaces are bonded together in a state in which they are not matched but shifted, by satisfying the relationship of $L \leq G$ between the predetermined precision L corresponding to this amount of displacement (the length of the section Z1 in FIG. 3(a) and FIG. 3(b)) and the length G of the gap areas 343 and 443, matching the recording range for one of the recording reproduction surfaces with the data area (442 in FIG. 3(a) and 342 in FIG. 3(b)), determining the recording range for the other recording reproduction surface to be an area including a part of the gap area in addition to the most part of the data area (X1 in FIG. 3(a) and X2 in FIG. 3(b)), and recording while matching the recording ranges of the two recording reproduction surfaces, that is, the data recording starting positions and the data recording ending positions, the recording for the second recording reproduction surface can be performed with a uniform recording power even when the first recording reproduction surface is already recorded. Therefore, such a non-uniform recording power as that described in the conventional example can be prevented, and an amplitude difference in the reproduction signal also can be suppressed. As a result, the recorded data information can be reproduced correctly.

In addition, the amount of information to be recorded in the two recording reproduction surfaces is not reduced from the amount predetermined for the data area of each recording reproduction surface. Moreover, when the bonding precision between the two recording reproduction surfaces is determined to be not more than the length of the gap area located between the address area and the data area, even if the recording starting positions of the two recording reproduction surfaces are matched, neither of the recording starting positions of the recording reproduction surfaces breaks into the address area of this recording reproduction surface. Therefore, the reproduction signal in the address area also is not affected.

As explained above, the recording method of a multilayer optical disc according to the present embodiment neither affects the amount of information to be recorded nor the reproduction signal in the address area and enables recording of optical information with a uniform recording power.

In addition, as described above, when two recording reproduction surfaces are provided, it is preferable to match the range for recording data with either one of the data areas of the recording reproduction surfaces.

Fourth Embodiment

A fourth embodiment relates to an information recording reproduction device for recording information in the multilayer optical disc described in the third embodiment.

In the following, an information recording reproduction device in the present embodiment will be explained by referring to the drawing. Since the intended multilayer optical disc was explained in the third embodiment, FIG. 3(a) and FIG. 3(b) will be referred to from time to time in the description.

Figure 4:
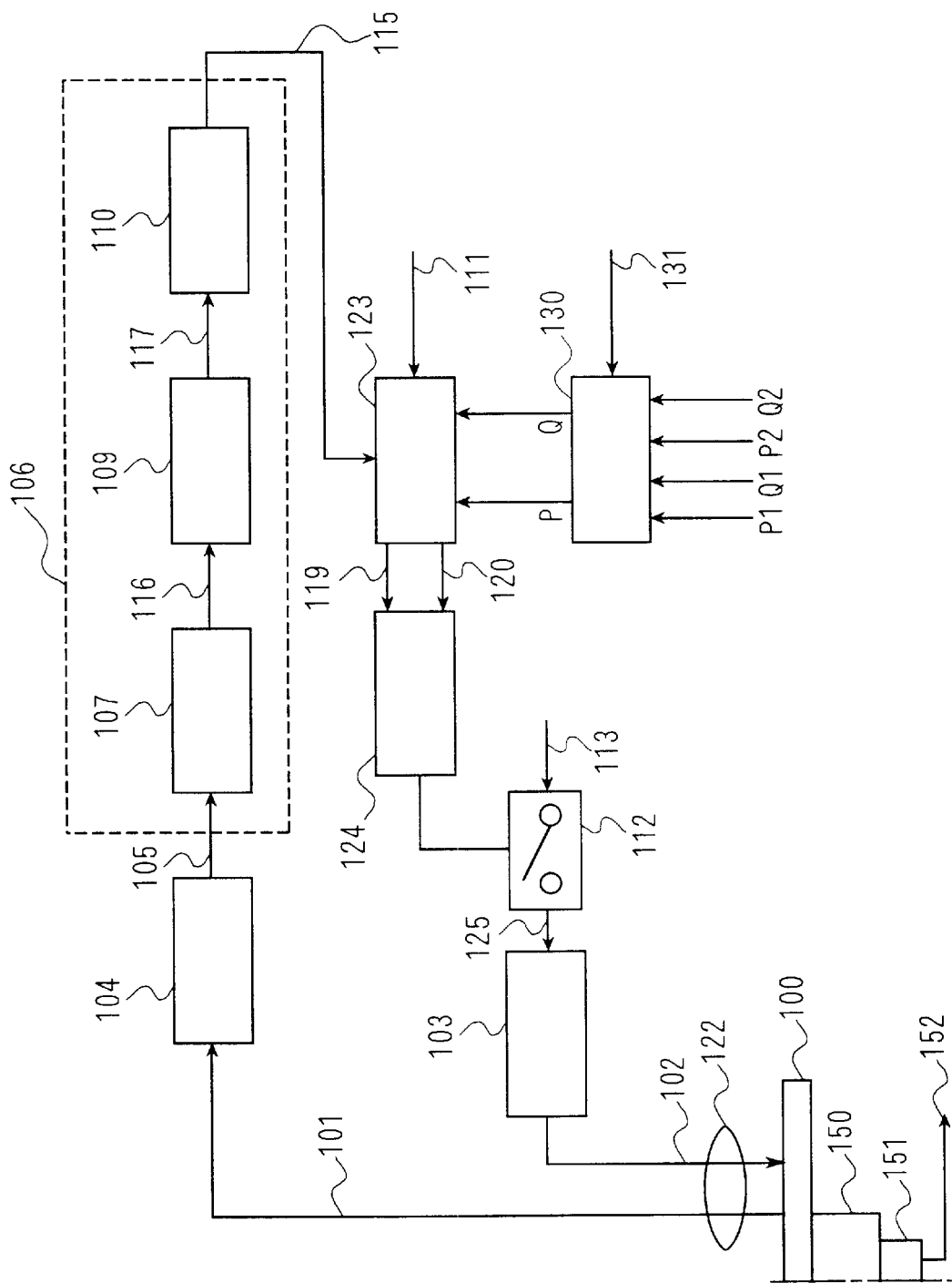
FIG. 4 is a block diagram showing an configuration of a multilayer optical disc recording device according to a fourth embodiment of the present invention.

FIG. 4 is a block diagram showing an information recording reproduction device according to a fourth embodiment of the present invention. In FIG. 4, 101 is a reproduction beam, and 102 is a recording beam. By using the reproduction beam 101 or the recording beam 102 via an objective lens 122, a signal is reproduced from or information is recorded in a multilayer optical disc 100 (having a double layer structure shown in FIG. 3(a) and FIG. 3(b)), which is rotating at a rate for obtaining a predetermined linear velocity. Furthermore, 150 is a motor for rotating the multilayer optical disc 100, and 151 is a rotary encoder attached to the motor for sending one pulse 152 per one rotation.

Furthermore, 104 is a photoelectric converter used for obtaining a reproduction signal 105 from the reproduction beam 101 as an electric signal. The reproduction signal 105 is input into an address signal reproduction processing part 106 (a part surrounded by the dotted line in FIG. 4) and processed therein by an envelope detector 107, a comparator 109 and an edge detector 110, and a reset signal 115 for a counter 123 is sent from the address signal reproduction processing part 106. On the other hand, in the counter 123, a clock 111 is input in its clock input terminal, and set values P and Q are input into their data input terminals.

When a recording operation is performed for the first recording reproduction surface 34 shown in FIG. 3(a) and FIG. 3(b), set values P1 and Q1 become the set values P and Q to be set for the counter 123 via a select circuit 130. On the other hand, when a recording operation is performed for the second recording reproduction surface 44, set values P2 and Q2 become the set values P and Q to be set for the counter 123 via the select circuit 130. Furthermore, the select circuit 130 is controlled by the state of a control command 131, and the state of the control command 131 is determined by whether the recording operation is performed for the first recording reproduction surface 34 or the recording operation is performed for the second recording surface 44.

Moreover, the counter 123 outputs a set input signal 119 of a flip-flop 124 after a first predetermined time, determined by the set value P and the frequency of the clock 111, has passed from the time when the reset signal 115 was activated. Furthermore, the counter 123 outputs a reset input signal 120 of the flip-flop 124 after a second predetermined time, determined by the set value Q and the frequency of the clock 111, has passed from the above time. Therefore, the first predetermined time and the second predetermined time respectively are different times when the recording for the first recording reproduction surface 34 and that for the second recording reproduction surface 44 are performed.

Furthermore, by controlling a switch 112 by an output signal 121 from the flip-flop 124, the supply of recording data 113 to an optical modulator 103 can be controlled, and a recording signal 125 can be obtained. Moreover, the recording beam 102 is obtained from the recording signal 125 through the function of the optical modulator 103, and this recording beam 102 is emitted onto the multilayer optical disc 100 via the objective lens 122 to record the desired data.

In this way, the counter 123, the set values P, Q thereof and the flip-flop 124 construct a recording gate generation part for generating recording gate signals.

Figure 5:
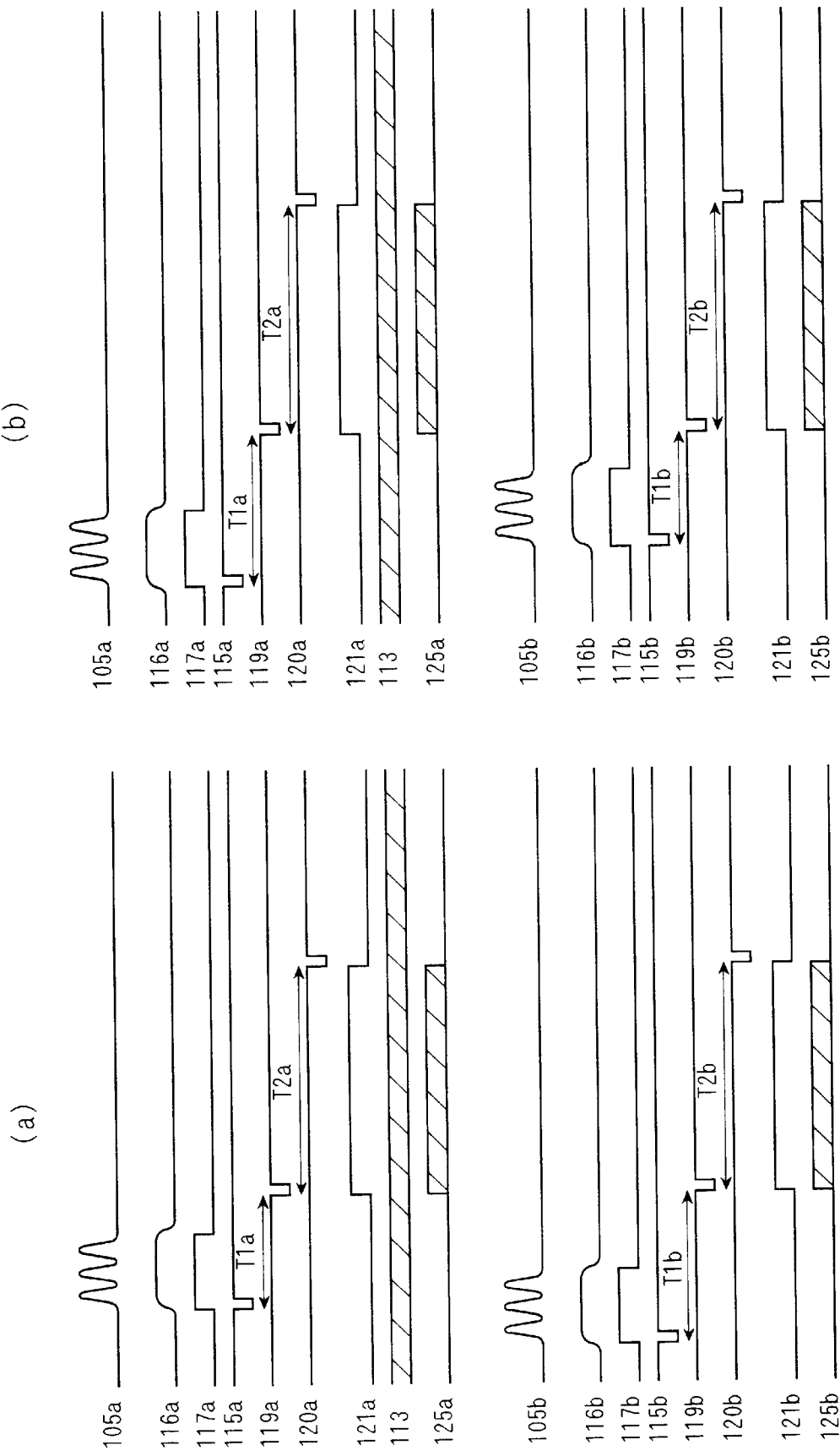
FIG. 5(a) and FIG. 5(b) are timing charts of major signals in the multilayer optical disc recording device shown in FIG. 4 respectively corresponding to a displacement of each recording reproduction surface shown in FIG. 3(a) and FIG. 3(b).

Next, the operation of the information recording reproduction device according to the embodiment of the above configuration will be explained first referring to FIG. 5(a) showing the timing of its major signal.

FIG. 5(a) shows the process of generating a timing for determining the operation at the time when a recording is performed for the multilayer optical disc shown in FIG. 3(a), in which the first recording reproduction surface 34 is bonded together with the bonding precision Z1 and in the state in which the first recording reproduction surface 34 is shifted to the right side of the surface relative to the second recording reproduction surface 44 (in addition, in FIG. 3(a), the optical beam 84 emitted as a recording beam from above the surface becomes a reproduction beam at the time of reproduction).

In FIG. 5(a), 105a, 116a, 117a and 115a respectively correspond to the reproduction signal 105 when the first recording reproduction surface 34 is reproduced (only the address reproduction signal from the address area is shown), an output signal 116 of the envelope detector 107, an output signal 117 of the comparator 109 and the output signal 115 of the edge detector 110 (the reset signal of the counter 123). Moreover, 119a and 120a respectively correspond to the set signal 119 and the reset signal 120 sent to the flip-flop 124 when the set values P and Q for the counter 123 respectively became P1 and Q1 by the select circuit 130, that is, when the recording for the first recording reproduction surface 34 is to be performed, and 121a corresponds to the output signal 121 of the flip-flop 124 (the control signal of the switch 112). Furthermore, T1a is a period from the time when 115a is activated to the time when 119a is activated, which corresponds to the first predetermined time mentioned above, and T2a is a period from the time when 119a is activated to the time when 120a is activated, which corresponds to the second predetermined time mentioned above.

Furthermore, T2a is equal to the period during which the output signal 121 of the flip-flop 124 (the control signal of the switch 112), that is, 121a is activated, and therefore, 125a is the timing of the recording signal 125 with which the recording data 113 is gated by the switch 112.

Furthermore, 105b, 116b, 117b and 115b respectively correspond to the reproduction signal 105 when the second recording reproduction surface 44 is reproduced (only the address reproduction signal is shown), the output signal 116 of the envelope detector 107, the output signal 117 of the comparator 109 and the output signal 115 of the edge detector 110 (the reset signal of the counter 123). Moreover, 119b and 120b respectively correspond to the set signal 119 and the reset signal 120 sent to the flip-flop 124 when the set values P and Q for the counter 123 respectively became P2 and Q2 by the select circuit 130, that is, when the recording for the second recording reproduction surface 44 is performed, and 121b corresponds to the output signal 121 of the flip-flop 124 (the control signal of the switch 112). Furthermore, T1b is a period from the time when 115b is activated to the time when 119b is activated, which corresponds to the first predetermined time mentioned above, and T2b is a period from the time when 119b is activated to the time when 120b is activated, which corresponds to the second predetermined time mentioned above.

Furthermore, T2b is equal to the period during which the output signal 121 of the flip-flop 124 (the control signal of the switch 112), that is, 121b is activated, and therefore, 125b is the timing of the recording signal 125 with which the recording data 113 is gated by the switch 112.

Therefore, T1a and T1a+T2a respectively are determined by the set values P1, Q1 and the clock frequency of the counter 123, and T1b and T1b+T2b respectively are determined by the set values P2, Q2 and the clock frequency of the counter 123. T1a and T1b, T1a+T2 and T1b+T2b respectively are different times.

Thus, in the case where the first recording reproduction surface 34 and the second recording reproduction surface 44 of the object multilayer optical disc 100 are bonded together as shown in FIG. 3(a), and the multilayer optical disc 100 is rotating at a predetermined linear velocity V, at the time when the recording for the first recording reproduction surface 34 is performed, the set value P1 is determined such that the value of T1a becomes equal to (A2+G2−Z1)/V (here, A2 and G2 respectively show the length of the address area 341 and the length of the gap area 343 on the first recording reproduction surface 34), and the set value Q1 is determined such that the value of T1a+T2a becomes equal to (A2+G2+Z2)/V. Then, the state of the control input 131 for the select circuit 130 is determined such that these values become the set values for the counter 123.

On the other hand, at the time when the recording for the second recording reproduction surface 44 is performed, the set value P2 is determined such that the value of T1b becomes equal to (A3+G3)/V (here, A3 and G3 respectively show the length of the address area 441 and the length of the gap area 443 on the second recording reproduction surface 44), and the set value Q2 is determined such that the value of T1b+T2b becomes equal to (A3+G3+Z1+Z2)/V, that is, (A3+G3+D3)/V (here, D3 shows the length of the data area 442 on the second recording reproduction surface 44). Then, as mentioned above, the state of the control input 131 for the select circuit 130 is determined such that these values become the set values for the counter 123.

In this way, while the recording signal 125a for the first recording reproduction surface 34 and the recording signal 125b for the second recording reproduction surface 44 are activated, both T2a and T2b have the same timing, so that the data recording starting positions and the data recording ending positions are matched on the first recording reproduction surface 34 and the second recording reproduction surface 34. That is, the recording ranges become the section X1 of the first recording reproduction surface 34 shown in FIG. 3(a) and the data area 442 of the second recording reproduction surface 44, so that the recording ranges are matched.

In other words, when the recording for the first recording reproduction surface 34 is performed, the recording starting position thereof is advanced from the front of the data area 342 by the bonding precision Z1 between the two recording reproduction surfaces (i.e. shifted to the direction opposite to the scanning direction), and the recording ending position is set to be the back end of the area Z2 where the data area 342 of the first recording reproduction surface 34 overlaps with the data area 442 of the second recording reproduction surface 44. When the recording for the second recording reproduction surface 44 is performed, by determining the predetermined data area 442 as the recording range, the data recording starting positions and the data recording ending positions on the two recording reproduction surfaces are matched, that is, the recording ranges are matched.

Next, the operation of the information recording reproduction device according to the present embodiment shown in FIG. 4 will be explained referring to FIG. 5(b) showing the timing of its major signal.

FIG. 5(b) shows the process of generating a timing for determining the operation at the time when a recording is performed for the multilayer optical disc shown in FIG. 3(b), in which the first recording reproduction surface 34 is bonded together with the bonding precision Z1 and in the state in which the first recording reproduction surface 34 is shifted to the right side of the surface relative to the second recording reproduction surface 44 (in addition, in FIG. 3(b), the optical beam 84 emitted as a recording beam from above the surface becomes a reproduction beam at the time of reproduction).

In FIG. 5(b), 105a, 116a, 117a and 115a respectively correspond to the reproduction signal 105 when the first recording reproduction surface 34 is reproduced (only the address reproduction signal from the address area is shown), an output signal 116 of the envelope detector 107, an output signal 117 of the comparator 109 and the output signal 115 of the edge detector 110 (the reset signal of the counter 123). Moreover, 119a and 120a respectively correspond to the set signal 119 and the reset signal 120 sent to the flip-flop 124 when the set values P and Q for the counter 123 respectively became P1 and Q1 by the select circuit 130, that is, when the recording for the first recording reproduction surface 34 is to be performed, and 121a corresponds to the output signal 121 of the flip-flop 124 (the control signal of the switch 112). Furthermore, T1a is a period from the time when 115a is activated to the time when 119a is activated, which corresponds to the first predetermined time mentioned above, and T2a is a period from the time when 119a is activated to the time when 120a is activated, which corresponds to the second predetermined time mentioned above.

Furthermore, T2a is equal to the period during which the output signal 121 of the flip-flop 124 (the control signal of the switch 112), that is, 121a is activated, and therefore, 125a is the timing of the recording signal 125 with which the recording data 113 is gated by the switch 112.

Furthermore, 105b, 116b, 117b and 115b respectively correspond to the reproduction signal 105 when the second recording reproduction surface 44 is reproduced (only the address reproduction signal is shown), the output signal 116 of the envelope detector 107, the output signal 117 of the comparator 109 and the output signal 115 of the edge detector 110 (the reset signal of the counter 123). Moreover, 119b and 120b respectively correspond to the set signal 119 and the reset signal 120 sent to the flip-flop 124 when the set values P and Q for the counter 123 respectively became P2 and Q2 by the select circuit 130, that is, when the recording for the second recording reproduction surface 44 is performed, and 121b corresponds to the output signal 121 of the flip-flop 124 (the control signal of the switch 112). Furthermore, T1b is a period from the time when 115b is activated to the time when 119b is activated, which corresponds to the first predetermined time mentioned above, and T2b is a period from the time when 119b is activated to the time when 120b is activated, which corresponds to the second predetermined time mentioned above.

Furthermore, T2b is equal to the period during which the output signal 121 of the flip-flop 124 (the control signal of the switch 112), that is, 121b is activated, and therefore, 125b is the timing of the recording signal 125 with which the recording data 113 is gated by the switch 112.

Therefore, T1a and T1a+T2a respectively are determined by the set values P1, Q1 and the clock frequency of the counter 123, and T1b and T1b+T2b respectively are determined by the set values P2, Q2 and the clock frequency of the counter 123. T1a and T1b, T1a+T2 and T1b+T2b respectively are different times.

Thus, in the case where the first recording reproduction surface 34 and the second recording reproduction surface 44 of the object multilayer optical disc 100 are bonded together as shown in FIG. 3(b), and the multilayer optical disc 100 is rotating at a predetermined linear velocity V, at the time when the recording for the first recording reproduction surface 34 is performed, the set value P1 is determined such that the value of T1a becomes equal to (A2+G2)/V, and the set value Q1 is determined such that the value of T1a+T2a becomes equal to (A2+G2+D2)/V. Then, the state of the control input 131 for the select circuit 130 is determined such that these values become the set values for the counter 123.

On the other hand, at the time when the recording for the second recording reproduction surface 44 is performed, the set value P2 is determined such that the value of T1b becomes equal to (A3+G3−Z1)/V (here, A3 and G3 respectively show the length of the address area 441 and the length of the gap area 443 on the second recording reproduction surface 44), and the set value Q2 is determined such that the value of T1b+T2b becomes equal to (A3+G3+Z2)/V. Then, when the state of the control input 131 for the select circuit 130 is determined such that these values become the set values for the counter 123, both the times T2a and T2b during which the recording signal 125a for the first recording reproduction surface 34 and the recording signal 125b for the second recording reproduction surface 44 are activated have the same timing, so that the data recording starting positions and the data recording ending positions are matched on the first recording reproduction surface 34 and the second recording reproduction surface 34. That is, the recording ranges become the data area 342 of the first recording reproduction surface 34 and the section X2 of the second recording reproduction surface 34 shown in FIG. 3(b), so that the recording ranges are matched.

In other words, when the recording for the first recording reproduction surface 34 is performed, the predetermined data area 342 is determined as the recording range, and when the recording for the second recording reproduction surface 44 is performed, the data recording starting position is advanced from the front of the data area 442 by the bonding precision Z1 between the two recording reproduction surfaces (i.e. shifted to the direction opposite to the scanning direction), and the recording ending position is set to be the back end of the area Z2 where the data area 342 of the first recording reproduction surface 34 overlaps with the data area 442 of the second recording reproduction surface 44. Thus, the data recording starting positions and the data recording ending positions on the two recording reproduction surfaces are matched, that is, the recording ranges are matched.

In addition, the calculation of the bonding precision Z2 between the first recording reproduction surface 34 and the second recording reproduction surface 44 (the detection of the amount of displacement) may be performed as follows. That is, first, from the time when one pulse 152 per one rotation is output from the rotary encoder 151, the output time of the output signal 116 from the envelope detector 107 at the time when the first recording reproduction surface 34 is reproduced is measured. Next, from the time when one pulse 152 per one rotation is output from the rotary encoder 151, the output time of the output signal 116 from the envelope detector 107 at the time when the second recording reproduction surface 44 is reproduced is measured. Then, the time difference between them is calculated and divided by the linear velocity V.

Furthermore, the section Z2 where the data area 342 of the first recording reproduction surface 34 overlaps with the data area 442 of the second recording reproduction surface 44 can be calculated easily based on the previously calculated value of Z1, since the lengths of the data areas on the two recording reproduction surfaces are already known.

In addition, the configuration of the multilayer optical disc used for the present embodiment is the same as that shown in FIG. 3(a) and FIG. 3(b) described in the third embodiment. However, when the place where the gap area is to be inserted is located between the data area and the address area of the next sector, the data recording starting position of the first recording reproduction surface 34 or the second recording reproduction surface 44 can be delayed by the bonding precision thereof so as to match the data recording starting positions and the data recording ending positions of the two recording reproduction surfaces, that is, the recording ranges.

As described above, even when the first recording reproduction surface 34 and the second recording reproduction surface 44 are bonded together in the state in which they are shifted by the predetermined precision Z1, by determining the recording range of the first recording reproduction surface 34 and the recording range of the second recording reproduction surface 44 as mentioned above, even in the case where the first recording reproduction surface 34 is already recorded, the transmittance of the recording beam in the recording range of the second recording reproduction surface 44 becomes constant, so that the power of recording beam emitted onto this recording range of the second recording reproduction surface 44 becomes uniform at the time of recording.

Therefore, a difference in the signal amplitude of the reproduction signal resulting from the non-uniformity of the power of recording beam can be eliminated within the recorded range, and data can be read out correctly from the reproduction signal. In particular, when a phase change type material is used for the recording films constructing the recording reproduction surfaces, due to the fact that its phase state changes by recording and that the difference in the transmittance before and after the recording is large, more remarkable effect can be obtained.

Fifth Embodiment

Figure 6:
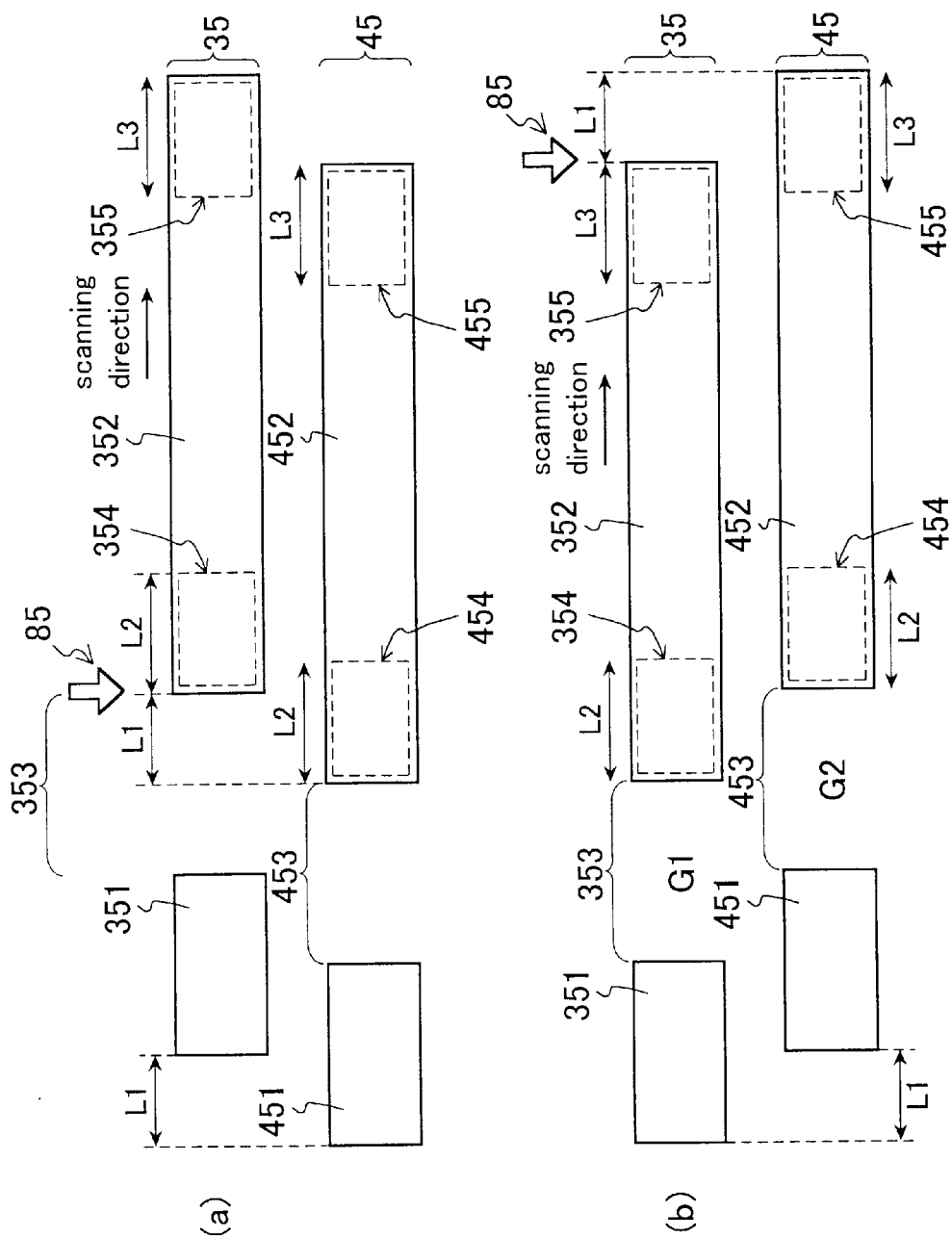
FIG. 6(a) and FIG. 6(b) are diagrams respectively showing a schematic sector structure of each recording reproduction surface in a multilayer optical disc according to a fifth embodiment of the present invention, in cases where a first recording reproduction surface is shifted in the scanning direction relative to a second recording reproduction surface and in the direction opposite to the scanning direction.
Figure 7:
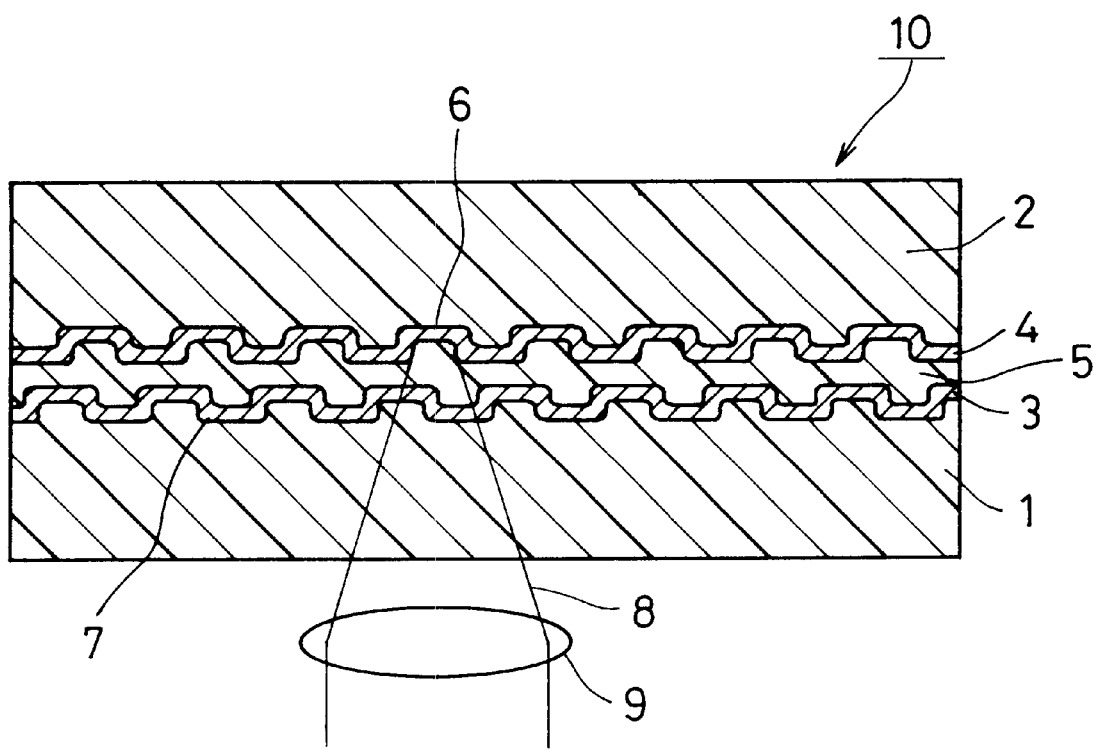
FIG. 7 is a cross-sectional view showing a conventional multilayer optical disc taken in the direction perpendicular to the tracking direction.

FIG. 6(a) and FIG. 6(b) are diagrams showing the actual sector structure of each recording reproduction surface in a multilayer optical disc according to a fifth Embodiment of the present invention, which is expressed in the form of a schematic sector structure.

First, it will be explained referring to FIG. 6(a). FIG. 6(a) shows a state in which a first recording reproduction surface 35 is shifted in the scanning direction (to the right side of the surface) of an optical beam 85 relative to a second recording reproduction surface 45 when the first recording reproduction surface 35 and the second recording reproduction surface 45 are bonded together.

In FIG. 6(a), 35 and 45 respectively are the first recording reproduction surface and the second recording reproduction surface in the present embodiment shown in the form of sector formats. 351 and 451 respectively show address areas of the first recording reproduction surface 35 and the second recording reproduction surface 45, and 352 and 452 respectively show data areas of the first recording reproduction surface 35 and the second recording reproduction surface 45, 353 and 453 respectively show gap areas of the first recording reproduction surface 35 and the second recording reproduction surface 45.

Furthermore, 354 and 454 respectively show guard areas (guard data areas) allocated to tip portions (starting end portions) in the data areas of the first recording reproduction surface 35 and the second recording reproduction surface 45. Furthermore, 355 and 455 respectively show guard areas allocated to back end portions (termination portions) of the first recording reproduction surface 35 and the second recording reproduction surface 45. The four guard areas mentioned above are provided to protect the data to be recorded in the data areas, in which, for example, signals having a single frequency are recorded. Moreover, the guard areas 354 and 454, respectively allocated to the tip portions of the first recording reproduction surface 35 and the second recording reproduction surface 45, have the equal length L2, and the guard areas 355 and 455, respectively allocated to the back end portions of the first recording reproduction surface 35 and the second recording reproduction surface 45, have the equal length L3.

Furthermore, L1 shows an amount of displacement between front positions in sectors of the respective recording reproduction surfaces at the time when the first recording reproduction surface 35 and the second recording reproduction surface 45 are bonded together. This amount of displacement L1 is equal to the amount of displacement between the front positions in the data areas of the first recording reproduction surface 35 and the second recording reproduction surface 45 and shows a bonding precision between the first recording reproduction surface 35 and the second recording reproduction surface 45, which is L1≦L2, compared with the length L2 of the guard areas 354 and 454.

Here, provided that the data area 352 of the first recording reproduction surface 35 including the guard data is already recorded, when the recording is performed thereafter for the data area 452 of the second recording reproduction surface 45 including the guard data, a fluctuation in the effective power of the recording beam is generated due to the difference in the transmittance of the optical beam 85 between the area of the length L1 in the front portion of the data area 452 and the residual area. As a result, a difference in the amplitude of the reproduction signal arises.

However, the area of the length L1 at the front portion in the data area 452 of the second recording reproduction surface 45 is a part of the guard area 454 on the second recording reproduction surface 45, and the guard area is an area provided for the protection of data to be recorded in the data area as mentioned above, so that the reproduction data is not affected even if the reproduction signal in this area has an amplitude difference resulting from the effective power difference in the recording beam. Thus, correct reproduction data can be obtained.

In other words, when the bonding precision L1 between the first recording reproduction surface 35 and the second recording reproduction surface 45 is not more than the length L2 of the guard areas 354 and 454 respectively allocated to the tip portions in the data areas of the first recording reproduction surface 35 and the second recording reproduction surface 45, the reproduction data is not affected even when there is an amplitude difference in the reproduction signal resulting from the effective power difference in the recording beam, and therefore, correct reproduction data can be obtained.

Next, it will be explained referring to FIG. 6(b). FIG. 6(b) shows a state in which the first recording reproduction surface 35 is shifted in the direction opposite to the scanning direction (to the left side of the surface) of the optical beam 85 relative to the second recording reproduction surface 45 when the first recording reproduction surface 35 and the second recording reproduction surface 45 are bonded together.

In FIG. 6(b), as in FIG. 6(a), L1 shows an amount of displacement between front positions in sectors of the respective recording reproduction surfaces at the time when the first recording reproduction surface 35 and the second recording reproduction surface 45 are bonded together. This amount of displacement L1 is equal to the amount of displacement between the back end positions in the data areas of the first recording reproduction surface 35 and the second recording reproduction surface 45 and shows a bonding precision between the first recording reproduction surface 35 and the second recording reproduction surface 45, which is L1≦L3, compared with the length L3 of the guard areas 355 and 455.

Here, provided that the data area 352 of the first recording reproduction surface 35 including the guard data is already recorded, and when the recording is performed thereafter for the data area 452 of the second recording reproduction surface 45 including the guard data, a fluctuation in the effective power of the recording beam is generated due to the difference in the transmittance of the optical beam 85 between the area of the length L1 in the back end portion of the data area 452 and the residual area, so that a difference in the amplitude of the reproduction signal arises.

However, the area of the length L1 at the back end portion in the data area 452 of the second recording reproduction surface 45 is a part of the guard area 455 on the second recording reproduction surface 45, and the guard area is an area provided for the protection of data to be recorded in the data area as mentioned above, so that the reproduction data is not affected even if the reproduction signal in this area has an amplitude difference resulting from the effective power difference in the recording beam. Thus, correct reproduction data can be obtained.

In other words, when the bonding precision L1 between the first recording reproduction surface 35 and the second recording reproduction surface 45 is not more than the length L3 of the guard areas 355 and 455 respectively allocated to the back end portions in the data areas of the first recording reproduction surface 35 and the second recording reproduction surface 45, the reproduction data is not affected even when there is an amplitude difference in the reproduction signal resulting from the effective power difference in the recording beam, and therefore, correct reproduction data can be obtained.

As described above, according to the present embodiment, by determining the bonding precision between the first recording reproduction surface 35 and the second recording reproduction surface 45 to be not more than the length of the guard areas 354 and 454 respectively allocated to the tip portions in the data areas of the first recording reproduction surface 35 and the second recording reproduction surface 45, and also to be not more than the length of the guard areas 355 and 455 respectively allocated to their back end portions, it is possible to perform the recording for obtaining correct reproduction data constantly.

In addition, the present embodiment was explained by referring to the case of having two recording reproduction surfaces. However, also in the case of having three or more recording reproduction surfaces, by bonding the respective recording reproduction surfaces such that the bonding precision between the recording reproduction surfaces is not more than the length of the guard areas allocated to the tip portions of the data areas and also not more than the length of the guard areas allocated to their back end portions, it is possible to perform the recording for obtaining correct reproduction data constantly from an arbitrary recording reproduction surface.

What is claimed is:

1. A multilayer optical disc comprising a plurality of recording reproduction surfaces having a sector structure, in which an address area and a data area recorded in advance are divided by a gap area of a predetermined length, wherein the plurality of recording reproduction surfaces are bonded together such that front positions in sectors in the plurality of recording reproduction surfaces have a precision of not more than the length of the gap area.

2. A multilayer optical disc comprising a plurality of recording reproduction surfaces having a sector structure, in which an address area and a data area recorded in advance are divided by a gap area, bonded together with a predetermined precision with reference to front positions of the sectors, wherein the length of the gap area is not less than the predetermined precision with reference to the front positions of the sectors.

3. A multilayer optical disc comprising a first recording surface and a second recording surface, each having an address area, a data area for recording information and a gap area with a predetermined length arranged between the address area and the data area, wherein an amount of displacement between a front position in the address area of the first recording surface and a front position in the address area of the second recording surface, seen from a direction of a beam emitted onto the recording surfaces for recording and reproduction of information, is smaller than the length of the gap area.

4. A multilayer optical disc comprising a first recording surface and a second recording surface, each having an address area, a data area for recording information and a gap area with a predetermined length arranged between the address area and the data area, wherein an amount of displacement between a back end position in the address area of the first recording surface and a back end position in the address area of the second recording surface, seen from a direction of a beam emitted onto the recording surfaces for recording and reproduction of information, is smaller than the length of the gap area.

5. An optical information recording method for recording optical information in a multilayer optical disc including a plurality of recording reproduction surfaces formed on every layer, with a sector structure having a gap area arranged between an address area and a data area in a scanning direction of an optical beam, wherein a bonding precision L with reference to a front position in the sector of a certain recording reproduction surface and a length G of the gap area in the scanning direction satisfies a relationship of $L \leq G$ for all recording reproduction surfaces, the method comprising the steps of detecting an amount of displacement between front positions in the sectors of other recording reproduction surfaces relative to the front position in the sector of the certain recording reproduction surface, and, based on the detected amount of displacement, determining a data recording starting position and a data recording ending position for each recording reproduction surface such that the data recording starting position and the data recording ending position of the respective sectors are matched in the plurality of recording reproduction surfaces.

6. The optical information recording method according to claim 5, wherein the data recording starting position and the data recording ending position respectively are determined to be the starting position and the ending position in the data area of the recording reproduction surface where the front position of the sector is displaced most in a direction opposite to the scanning direction among the plurality of recording reproduction surfaces.

7. An optical information recording device for recording optical information in a multilayer optical disc including a plurality of recording reproduction surfaces formed on every layer, with a sector structure having a gap area arranged between an address area and a data area in a scanning direction of an optical beam, wherein a bonding precision L with reference to a front position in the sector of a certain recording reproduction surface and a length G of the gap area in the scanning direction satisfies a relationship of $L \leq G$ for all recording reproduction surfaces, the device comprising a detection part for detecting an amount of displacement between front positions in the sectors of other recording reproduction surfaces relative to the front position in the sector of the certain recording reproduction surface, and a gate signal generation part for generating a gate signal designating a data recording ending position from a data recording starting position for each recording reproduction surface to match the data recording starting positions and the data recording ending positions of the respective sectors in the plurality of recording reproduction surfaces, based on the amount of displacement detected by the detection part.

8. The optical information recording device according to claim 7, wherein the gate signal designates the data recording starting position and the data recording ending position to be the starting position and the ending position in the data area of the recording reproduction surface where the front position of the sector is displaced most in a direction opposite to the scanning direction among the plurality of recording reproduction surfaces.

9. A multilayer optical disc comprising layers on which a plurality of recording reproduction surfaces is formed, with a sector structure having a gap area arranged between an address area and a data area in a scanning direction of an optical beam, bonded together such that front positions in the sectors of the respective recording reproduction surfaces are contacted closely to each other in the scanning direction by a predetermined precision, wherein guard data recording areas having a length of not less than the predetermined precision are allocated to a tip portion and to a back end portion of the data area in the scanning direction.

* * * * *